(12) United States Patent
Tummala et al.

(10) Patent No.: US 6,915,345 B1
(45) Date of Patent: Jul. 5, 2005

(54) AAA BROKER SPECIFICATION AND PROTOCOL

(75) Inventors: Rambabu Tummala, Plano, TX (US); David J. Mitton, North Andover, MA (US); Haseeb Akhtar, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 918 days.

(21) Appl. No.: 09/677,274

(22) Filed: Oct. 2, 2000

(51) Int. Cl.[7] ............................................. G06F 15/173
(52) U.S. Cl. ................................... 709/225; 455/432.1
(58) Field of Search ................................. 709/225, 217, 709/202, 229, 249; 455/432.1, 432, 433; 370/328, 238, 329

(56) References Cited

U.S. PATENT DOCUMENTS

| | | | | |
|---|---|---|---|---|
| 6,366,561 B1 | * | 4/2002 | Bender | 370/238 |
| 6,421,714 B1 | * | 7/2002 | Rai et al. | 709/217 |
| 6,445,922 B1 | * | 9/2002 | Hiller et al. | 455/433 |
| 6,466,964 B1 | * | 10/2002 | Leung et al. | 709/202 |
| 6,466,977 B1 | * | 10/2002 | Sitaraman et al. | 709/225 |
| 6,668,283 B1 | * | 12/2003 | Sitaraman et al. | 709/229 |
| 6,714,987 B1 | * | 3/2004 | Amin et al. | 709/249 |
| 6,728,536 B1 | * | 4/2004 | Basilier et al. | 370/328 |
| 6,738,362 B1 | * | 5/2004 | Xu et al. | 370/329 |

OTHER PUBLICATIONS

Perkins, Charles E.; "Tutorial: Mobile Networking Through Mobile IP;" Jan. 1998; IEEE Internet Computing.
Townsley, W.; Valencia, A.; Rubens, A.; Pall, G.; Zorn, G.; and Palter, B.; "RFC 2661: Layer Two Tunneling Protocol"L2TP";" Aug. 1999; Network Working Group.
Perkins, C.; "RFC 2002: IP Mobility Support;" Oct. 1996; Network Working Group.

* cited by examiner

*Primary Examiner*—John Follansbee
*Assistant Examiner*—Jungwon Chang
(74) *Attorney, Agent, or Firm*—Hemingway, LLP; D. Scott Hemingway; Malcolm W. Pipes

(57) ABSTRACT

In an IP-based mobile communications system, the Mobile Node changes its point of attachment to the network while maintaining network connectivity. The present invention improves the attachment of the Mobile Node to the IP mobile communications system by allowing a AAA Broker Server to maintain client information necessary to establish the a secure Mobile Node connection to the home network.

39 Claims, 4 Drawing Sheets

FIG. 5

| AVP NAME | CODE | REQUIRED? | TYPE | DATA | DESCRIPTION |
|---|---|---|---|---|---|
| COMMAND-CODE | 256 | MUST | INT32 | | VALUE=DDR(345), DOMAIN-DISCOVERY-REQUEST |
| SESSION-ID | 263 | MUST | DATA | | SESSION IDENTIFIER |
| USER-NAME | 1 | MUST | STRING | | USER SUPPLIED DESTINATION NAME |
| HOST-NAME | 264 | MUST | STRING | | SENDING HOST NAME |
| DESTINATION NAI | 269 | OPT | STRING | | DESTINATION NETWORK ACCESS IDENTIFIER |
| ADDITIONAL AMR/AAR ATTRIBUTES | | MAY | | | AS NEEDED |
| AAF-TO-AAB-PASSWORD | 382 | MUST | COMPLEX | | CLIENT/BROKER IDENTIFIER ENCRYPTED WITH AAAF:AAAB SHARED KEY |
| TIMESTAMP | 262 | MUST | TIME | | TIME VALUE |
| NONCE | 261 | MUST | DATA | | RANDOM NUMBER |
| INTEGRITY-CHECK-VALUE | 259 | MUST | COMPLEX | | MESSAGE HASH VALUE |

FIG. 7

| AVP NAME | CODE | REQUIRED? | TYPE | DESCRIPTION |
|---|---|---|---|---|
| COMMAND-CODE | 256 | MUST | INT32 | VALUE=AMR, AA-MN-REQUEST |
| DESTINATION NAI | 269 | MUST | STRING | ORIGINAL REQUEST VALUE |
| ORIGINAL AMR ATTRIBUTES | | | | COPY OF MESSAGE FROM SMM |
| AAH-TO-AAF-KEY | 384 | MUST | COMPLEX | AS RETURNED FROM THE BROKER |
| AAH-TO-AAB-PASSWORD | 385 | MUST | COMPLEX | AS RETURNED FROM THE BROKER |
| BROKER-IDENTIFIER | 386 | MAY | STRING | IDENTIFICATION OF BROKER FOR REDIRECTED HOST |
| BROKER-CLIENT-INFO | 387 | MAY | STRING | IDENTIFICATION OF SLA |
| BROKER-REFERRAL-INFO | 388 | MAY | DATA | IDENT/TOKEN FOR REDIRECTION TRACKING? |
| TIMESTAMP | 262 | MUST | TIME | TIME VALUE |
| NONCE | 261 | MUST | DATA | RANDOM NUMBER |
| INTEGRITY-CHECK-VALUE | 259 | MUST | COMPLEX | MESSAGE HASH VALUE |

| AVP NAME | CODE | REQUIRED? | TYPE | DESCRIPTION |
|---|---|---|---|---|
| COMMAND-CODE | 256 | MUST | INT32 | VALUE=DDA (346) DOMAIN-DISCOVERY-ANSWER |
| RESULT-CODE | 268 | MUST | INT32 | VALUE=9: DIAMETER_REDIRECT_INDICATION 10= DIAMETER_DOMAIN_NOT_SERVED |
| DESTINATION NAI | 269 | MUST | STRING | PROCESSED TARGET REALM NAME |
| REDIRECT-HOST | 278 | MUST | STRING* | HOST IP ADDRESS |
| REDIRECT-HOST-PORT | 277 | MAY | INT32* | TCP PORT NUMBER IF NOT DEFAULT |
| SESSION-TIMEOUT | 27 | MAY | INT32* | REDIRECTION CACHE TIMEOUT AND SESSION KEY TIMEOUT FOR THIS HOST. |
| *TAGS | | MAY | | HOST INFORMATION MAY BE TAGGED FOR MULTIPLE ADDRESSES ON THE SAME HOST-CURRENTLY NOT IMPLEMENTED |
| AAF-TO-AAH-KEY | 383 | MUST | COMPLEX | SESSION KEY ENCRYPTED WITH AAAF:AAAB SHARED KEY |
| AAH-TO-AAF-KEY | 384 | MUST | COMPLEX | SESSION KEY ENCRYPTED WITH AAAB:AAAH SHARED KEY |
| AAH-TO-AAB-PASSWORD | 385 | MUST | COMPLEX | HOME/BROKER IDENTIFIER ENCRYPTED WITH AAAB:AAAH SHARED KEY |
| BROKER-IDENTIFIER | 386 | MAY | STRING | IDENTIFICATION OF BROKER FOR REDIRECTED HOST |
| BROKER-CLIENT-INFO | 387 | MAY | STRING | IDENTIFICATION OF SLA |
| BROKER-REFERRAL-INFO | 388 | MAY | DATA | IDENT/TOKEN FOR REDIRECTION TRACKING? |
| TIMESTAMP | 262 | MUST | TIME | TIME VALUE |
| NONCE | 261 | MUST | DATA | RANDOM NUMBER |
| INTEGRITY-CHECK-VALUE | 259 | MUST | COMPLEX | MESSAGE HASH VALUE |

*FIG. 6*

AAA BROKER SPECIFICATION AND PROTOCOL

TECHNICAL FIELD OF THE INVENTION

A modified registration message format for use in an IP-based mobile communication system having a home network, foreign network and a mobile node.

BACKGROUND OF THE INVENTION

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department required that the system to be used for communication between these military computer networks be decentralized and that no critical services be concentrated in vulnerable failure points. In order to achieve these goals, the Defense Department established a decentralized standard protocol for communication between network computers.

A few years later, the National Science Foundation (NSF) wanted to connect network computers at various research institutions across the country. The NSF adopted the Defense Department's protocol for communication, and this combination of research computer networks would eventually evolve into the Internet.

Internet Protocols

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical Internet-based communication scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the same protocols on a similar application program—only in reverse order. Because standard protocols are used in Internet communications, the TCP/IP protocol on the second computer decodes the transmitted information into the original information transmitted by the first computer.

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers. As an alternative, User Datagram Protocol ("UDP") supports the same type of layered protocol communication system, but with less accuracy checking on message content than the TCP/IP protocol.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because the standardized layer design of TCP/IP, a consistent conversion of base data is ensured regardless of the version or vendor of the TCP/IP conversion software.

TCP/IP Addressing and Routing

A computer operating on a network is assigned a unique physical address. On a Local Area Network ("LAN"), the physical address of the computer is a number given to computer's network adapter card. Hardware LAN protocols use this physical address to deliver packets of data, sometimes called information packets, to computers on the LAN.

On the Internet, the TCP/IP protocol routes information packets using logical addressing. The network software in the Network Layer generates logical addresses. Specifically, a logical address in the TCP/IP network is translated into a corresponding physical address using the ARP (Address Resolution Protocol) and RARP (Reverse Address Resolution Protocol) protocols in the Network Layer.

The TCP/IP's logical address is also called an IP address. The IP address can include: (1) a network ID number identifying a network, (2) a sub-network ID number identifying a sub-network on the network, and, (3) a host ID number identifying a particular computer on the sub-network. The header data in the information packet will include source and destination addresses. The IP addressing scheme imposes a sensible addressing scheme that reflects the internal organization of the network or sub-network.

A computer network is often subdivided into smaller sub-networks. The computer network is divided in this manner to increase data transmission efficiency and reduce overall network traffic. Routers are used to regulate the flow of data into and out of designated sub-networks of the computer network.

A router interprets the logical address of a information packet, such as an IP address, and directs the information packet across the network to its intended destination. Information packets addressed between computers on the sub-network do not pass through the router to the greater network, and therefore does not clutter the transmission lines of the greater network. If data is addressed to a computer outside the sub-network, however, the router forwards the data onto the larger network.

The TCP/IP network includes protocols that define how routers will determine the path for data through the network. Routing decisions are based upon information in the IP packet header and entries in each router's routing table. A routing table possesses sufficient information for a router to make a determination on whether to accept the communicated information on behalf of a destination computer, or pass the information onto another router in the network. The routing table also permits the router to determine where the information should be forwarded within the network or sub-network.

The routing table can be configured manually with routing table entries or a dynamic routing protocol that can accommodate changing network topologies—network architecture, network structure, layout of routers, and inter-connections between hosts and routers. In a dynamic routing protocol, a router advertises reachability when it sends updated routing information to a second router claiming that the first router is capable of reaching one or more destination addresses. Advertising accessibility is important to the process of receiving, directing and re-directing information packets on the Internet.

The IP-Based Mobility System

Internet protocols were originally developed with an assumption that Internet users, which are assigned a unique IP address, would be connected to a single, fixed network—that is, one physical fixed location. With the advent of portable computers and cellular wireless communication systems, however, the movement of Internet users within a network and across network boundaries has become quite common. Because of this highly mobile Internet usage, the implicit design assumptions for the Internet protocols have been violated.

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single Mobile Node home network for IP addressing purposes.

The home network has a Home Agent and the foreign network has a Foreign Agent—both of which control the routing of information packets into and out of their network. The terms Home Agent and Foreign Agent may be defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network having the responsibility to manage mobility-related functionality for a Mobile Node on a home network. Likewise, the term Foreign Agent, as used in this application, can refer to a Serving Mobility Manager, Visited Location Register, Visiting Serving Entity, or any other agent on a foreign network having the responsibility to manage mobility-related functionality for a Mobile Node on a foreign network.

Registration of a Mobile Node

The Mobile Node keeps the Home Agent informed of its current location by registering a care-of address with the Home Agent. Essentially, the care-of address represents the current foreign network where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address.

The Foreign Agent participates in informing the Home Agent of the Mobile Node's current care-of address. The Foreign Agent also de-tunnels information packets for the mobile node after the information packets have been forwarded to the Foreign Agent by the Home Agent. Further, the Foreign Agent serves as a default router for out-going information packets generated by the mobile node while connected to the foreign network.

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, no additional actions need to be taken because information packets will be routed to the Mobile Node according to the standard addressing and routing scheme. If the Mobile Node is visiting a foreign network, however, the mobile node obtains a care-of address from the agent advertisement, and registers this care-of address with its Home Agent. The registered care-of address identifies the foreign network where the mobile node is located, and the Home Agent uses this registered care-of address to tunnel information packets to the foreign network for subsequent transfer to the mobile node.

Confidential Communications Over a Public Network

Because information packets are routed over the public networks that make up the Internet, cryptographic security systems are used to send communications in a confidential manner. These security systems maintain the confidentiality of the information packet by encoding, or encrypting, the information in the information packet. The encryption process can only be reversed, or decoded, by an authorized person. Other activities performed by the security system include authentication (you are who you say you are), integrity checking (the information packet was sent in the decoded form) and non-repudiation (identification of person sending the information packet).

A cryptographic security system consists of two fundamental components—a complicated mathematical algorithm for encrypting the information, and one or more values, called keys, known to parties authorized to transmit or receive the information packet. The greater the complexity of the algorithm, the stronger the cryptographic level of security in the cryptographic system. Because of its complexity, the algorithm can be kept secret or publicly disclosed without undermining the strength of the security system.

As an example of the encryption process, let's examine the situation where Party A intends to communicate confidentially with Party B using the cryptographic security system. First, Party A uses the algorithm and a key to transform the information in the transmitted information packet into encrypted information. In order to maintain the confidentiality of the transmitted information, the encrypted information does not resemble the information in the information packet, and the encrypted information cannot be easily decoded into its original form without the use of the algorithm and a key.

As such, the encrypted information is transmitted over the public networks on the Internet to Party B without disclosing the content of the original information packet. After receiving the encrypted information packet, Party B decodes the encrypted information using the algorithm and a key. When the encrypted information is decoded, the original information should be disclosed in the decoded information packet.

Key-Based Cryptographic Systems

It is preferable that the key be known only to the appropriate or authorized parties to the communication. This type of key is known as a "secret key", and the sender and receiver of the information packet use the same secret key to encrypt and decode information packets with the algorithm. Public key encryption is also supported by cryptographic security systems where the sender has a public key and a private key, and the receiver has a public key and a private key. Messages may be encoded by the sender using the receiver's public key, and decoded by the receiver using the receiver's private key. Hybrid security systems are also used to encrypt and decode information in information packets. Accordingly, key-based security systems rely on the use of some type of secret key to support confidential communications.

Authenticate, Authorize and Accounting ("AAA")

In an IP-based mobile communications system, the Mobile Node changes its point of attachment to the network while maintaining network connectivity. The Mobile IP Protocol (RFC 2002) assumes that mobile IP communications with a Mobile Node will be performed on a single administrative domain or a single network controlled by one administrator.

When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node. This authentication, authorization, and accounting activity is called "AAA".

AAA servers on the home and foreign network will perform the AAA activities. Security concerns arise in the mobile communications systems with multiple administrative domains because authorized users are subject to the following forms of attack: (1) session stealing where a hostile node hijacks the network session from mobile node by redirecting information packets, (2) spoofing where the identity of an authorized user is utilized in an unauthorized manner to obtain access to the network, and (3) eavesdropping and stealing of information during a session with an authorized user. Authentication is the process of proving someone's claimed identity, and security systems on a mobile IP network will often require authentication of the system user's identity before authorizing a requested activity. The AAA server authenticates the identity of an authorized user, and authorizes the Mobile Node's requested activity. Additionally, the AAA server will also provide the accounting function including tracking usage and charges for use of transmissions links between administrative domains.

The Diameter base protocol supports a first basic message routing methods, called Diameter proxy. A simple Diameter proxy is a server that simply forwards the request based on a decision process such as NAI parsing or other decision. A Diameter proxy is a server that provides message forwarding functions to other Diameter Servers. Proxies are typically used when a hierarchical Diameter network is deployed, where each Diameter servers can only authenticate and authorize a given set of users. An example may be a large corporation, where the user base is maintained within individual divisions or campuses.

SUMMARY OF THE INVENTION

Proxy message routing has its disadvantages in a significantly high overhead with multiple level foreign and mobile foreign agents. To avoid this overhead, a second message routing method was developed called broker protocol, or broker redirection. A broker is a server that responds back to a message routing request, providing information on how the peer may establish the service directly to the target host agent. This allows networks to interact with a large set of providers, whilst only maintaining a service agreement with a Roaming Consortium and its broker systems.

Broker AAA Servers and the services they support will have Service Level Agreements (SLAs) between their clients. This information is provisioned between the parties, when such arrangements are made. A service level agreement (SLA) may be created between networks on the Internet to establish Security Associations between Authentication, Authorization, and Accounting ("AAA") servers on various administrative domains or networks. The AAA servers on the SLAs can assist in the management of SAs and the uniform transfer of encrypted information packets between AAA servers using a well-defined security protocol. By working cooperatively, the AAA servers form a secure network for communications.

To eliminate the need for each network to establish individual SLA's with every other service provider and network on the Internet, Broker AAA Servers can be assigned the responsibility of establishing and maintaining SLAs found on different networks (and reciprocal agreements with other SLAs and Broker AAA Servers). Accordingly, the Broker AAA Server becomes a consortium of agreements between various networks and service providers.

A home network need only establish one relationship with the Broker AAA Server in order to gain access to the other SLAs supported by the Broker AAA Server. With the support of such a Broker AAA Server, a mobile node from the home network can roam about any other network supported by the home network's Broker AAA Server.

A Broker AAA Server should only return information to a requester that they are authorized to obtain. The present invention details the optimal operations for the transmission of messages from the foreign agent AAA Server to the Broker AAA Server, how the message transmitted to the Broker AAA Server will processed, and the what response message is expected by the foreign agent AAA Server.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 5 is a table of Attribute Value Pair ("AVP") values used in the Domain Discovery Requests ("DDR") for the broker redirection protocol;

FIG. 6 is a table of AVP values for Domain Discovery Answer ("DDA"); and,

FIG. 7 is a table of AVP values for the AMR message in the broker redirection protocol.

DETAILED DESCRIPTION OF THE PREFERRED EMBODIMENTS

Mobile IP protocols support the routing of data communications to mobile nodes on the Internet. In a mobile IP system, each mobile node is identified by a permanent IP address. While the mobile node is coupled to its home network, the mobile node functions as any other fixed node on that network. When the mobile node moves from its home network to a foreign network, however, the home network sends data communications to the mobile node by "tunneling" the communications to the foreign network where the mobile user is located.

A care-of address identifies the foreign network where the mobile node is located. Mobile IP protocols require that the mobile node register the care-of address with the Home Agent on the home network after movement to a new network. After registration, all communications addressed to the mobile node are still routed according to normal IP protocols to the mobile node's home network. After the Home Agent receives this communication, however, the Home Agent sends, or "tunnels", the message to the mobile user at the foreign network via the care-of address. The Foreign Agent accepts the redirected communication and delivers this communication to the mobile node located on its network.

"Tunneling" of Information Packets

Figures 1, 2:
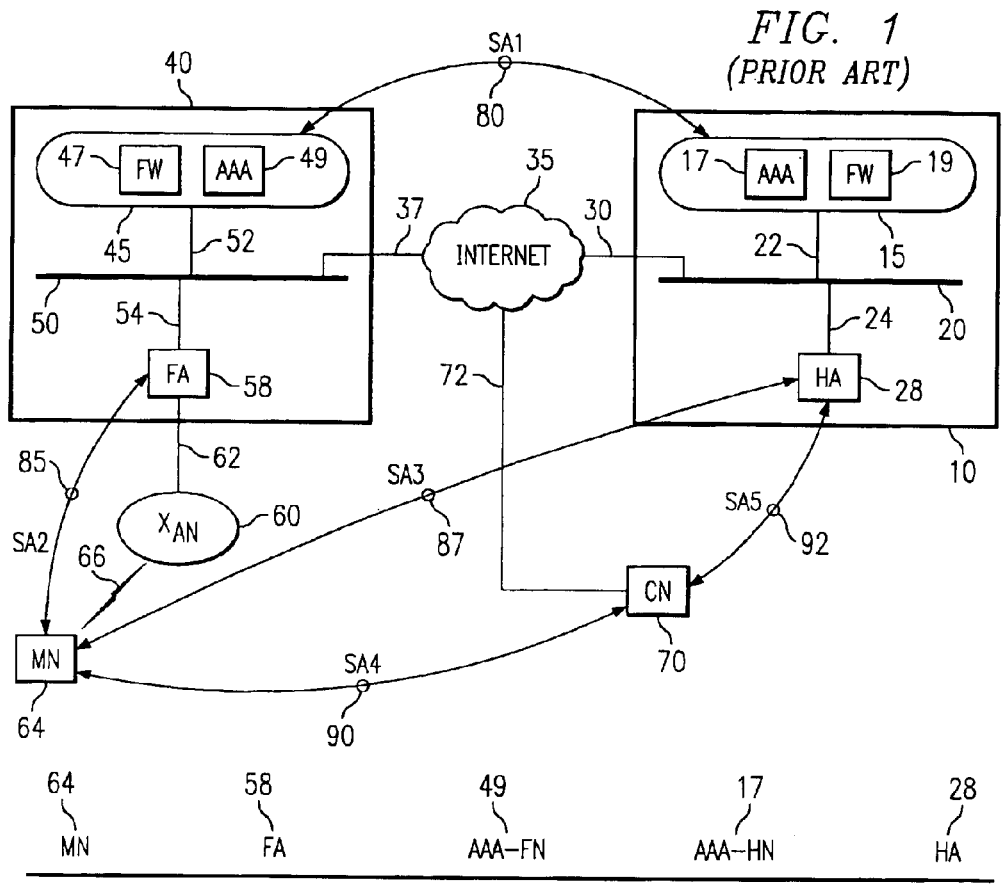
FIG. 1 is a prior art schematic diagram of the networks configurations surrounding the Internet.
FIG. 2 is a prior art message flow sequence for establishing an SA.

Looking at FIG. 1, the overall architecture of the IP-based mobile system is shown with Mobile Node 64, home network 10 and foreign network 40. The home network 10 has a central buss line 20 coupled to the home agent 28 via communication link 24, and the buss line 20 is coupled to the secure messaging gateway 15 via communication link 22. The secure messaging gateway 15 includes the Home AAA server 17, or AAAH, and firewall 19 for the home network. The home network 10 is coupled to the public Internet 35 via communication link 30. A communications link is any connection between two or more nodes on a network or users on networks or administrative domains.

The foreign network 40 has a central buss line 50 coupled to the foreign agent 58 via communication link 54, and the buss line 50 is coupled to the secure messaging gateway 45 via communication link 52. The secure messaging gateway 45 includes the Foreign AAA server 49, or AAAF, and firewall 47 for the foreign network. The foreign network 40 is coupled to the public Internet 35 via communication link 37.

A Mobile Node 64 is shown electronically coupled to the foreign network 40 via the communication link 66 of transceiver 60. Transceiver 60 is coupled to the foreign network via communication link 62. The Mobile Node 64 can communicate with any transceiver or Access Network coupled to the foreign network 40. The system also includes a correspondent node CN 70, which is a node capable of communicating with the Mobile Node 64. The correspondent node CN 70 is coupled to the public Internet 35 via communication link 72.

In the system shown in FIG. 1, the Mobile Node 64 would have a care-of address of the foreign network 40, and the Mobile Node 64 would have registered its care-of address with the Home Agent 28. When the Correspondent Node 70 sends a communication, or information packets, to the Mobile Node 64, these information packets would be sent to the Home Agent as the agent advertising accessibility to the Mobile Node 64 on the networks.

The Home Agent 28 would transfer, or tunnel, the information packets sent by the Correspondent Node 70 to the Foreign Agent 58 at the care-of address for the Mobile Node 64. The Foreign Agent 58 would, in turn, transfer the information packets to the Mobile Node 64 through the transceiver 60. In this manner, the information packets addressed to the Mobile Node 64 at its usual address on the home network 10 are redirected to the Mobile Node 64 on the foreign network.

Registration of Mobile Nodes

Looking at FIG. 2, the prior art sequence of steps for establishing a connection with the redirection of the registration request and response through the AAA servers can be seen in FIG. 2 in steps 100 to 106 where the registration request from the Mobile Node 64 to the Foreign Agent 58 is shown in step 100, the registration request from the Foreign Agent 58 to the AAA server 49 at the foreign network 40 is shown in step 102, the registration request from the AAA server 49 at the foreign network 40 to the AAA server 17 at the home network 10 in step 104, and the registration request from the AAA server 17 on the home network 10 to the Home Agent 28 in step 106.

The redirection of the registration response through the AAA servers is shown in steps 110 to 116 where the registration response from Home Agent 28 to AAA server 17 on the home network 10 is shown in step 110, registration response from AAA server 17 on the home network 10 to AAA server 49 on the foreign network 40 is shown in step 112, registration response from the AAA server 49 on the foreign network 40 to the Foreign Agent 58 is shown in step 114, and registration response from the Foreign Agent 58 to the Mobile Node 64 is shown in step 116.

If the Foreign Agent 58 is capable of establishing an secure connection, then the agent advertisement issued by the Foreign Agent 58 should be expanded to indicate this capability to the Mobile Node 64. The Mobile Node 64 can then initiate establishment of the secure connection, and it is recommended that the Aggressive Mode of the Internet Key Exchange protocol (IKE) can be used as shown in step 120 of FIG. 2. The Quick Mode in step 122 can also be used to speed the SA set-up operation as shown in FIG. 2. Lastly, in order to enhance the registration process, the registration response from the Home Agent 28 to the Foreign Agent 58 can carry the public key associated with the Mobile Node 64, and the response could also carry the public key of the Foreign Agent 58 from the Foreign Agent 58 to the Mobile Node 64.

Service Level Agreements (SLAs)

Figure 3:
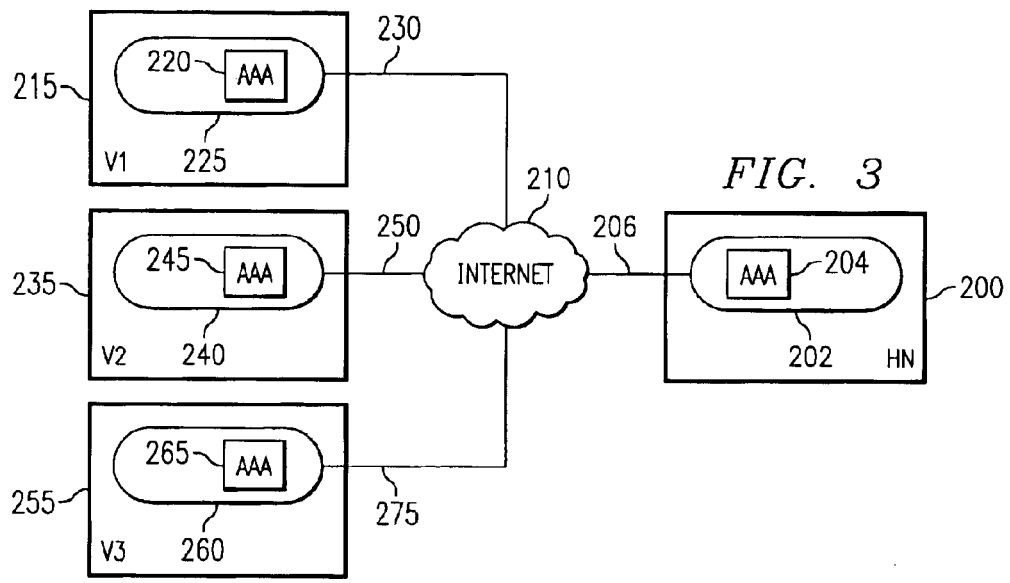
FIG. 3 is a schematic diagram of the Virtual Private Network created by a common Service Level Agreement.

A service level agreement (SLA) can be created between networks on the Internet to establish an association between Authentication, Authorization, and Accounting ("AAA") servers on various networks. These associations can support a security connection between networks as well as supporting other services on the connection. In FIG. 3, an SLA can exist between the home network 200 and the foreign networks 215. Likewise, SLA may exist between the home network 200 and the foreign networks 235 and 255, respectively.

The home network 200 includes the secure messaging gateway 202 with the AAA server 204. The secure messaging gateway 202 couples the home network 200 to the Internet 210 via communication link 206. The foreign network 215 to the Internet 210 includes the secure messaging gateway 225 with the AAA server 220. The secure messaging gateway 225 couples the foreign network 215 to the Internet 210 via communication link 230. The foreign network 235 includes the secure messaging gateway 240 with the AAA server 245. The secure messaging gateway 240 couples the foreign network 235 to the Internet 210 via communication link 250. The foreign network 255 includes the secure messaging gateway 260 with the AAA server 265. The secure messaging gateway 260 couple the foreign network 255 via communication link 275.

The AAA servers 204, 220, 245 and 265 can assist in the management of SAs and support the uniform transfer of encrypted information packets using a well-defined security protocol. An SLA can be established between the AAA servers on the several foreign networks 215, 235 and 255 and home network 200. The secure messaging gateways 202, 225, 240 and 260 also play the role as security gateway (firewall functions) for their respective network.

Routing devices, such as a foreign agent or home agent, know about the existence of an AAA server 204, 220, 245 and 265 on a network, and all information packets transmitted in a secure mode should be routed through this routing device. One AAA server 204, 220, 245 and 265 then communicates with another AAA server on the network via a confidential communication link. By working cooperatively, the AAA servers 204, 220, 245 and 265 form a secure network for communications. Essentially, this system of SAs uses a single SLA to form a Virtual Private Network (or "VPN") between the foreign networks 215, 235 and 255 and the home network 200 thereby supporting secure tunneling of information packets among the networks on the VPN. Because a single SLA supports the networks 200, 215, 235 and 255 in the VPN shown in FIG. 3, a mobile node can roam among these networks 200, 215, 235, and 255 and securely access the network at any point in the VPN.

The AAA servers 204, 220, 245 and 265 in the VPN shown in FIG. 3 support the security gateways 202, 225, 240 and 260 for the networks 200, 215, 235 and 255, respectively. The home agents and foreign agents on the networks are aware of the AAA servers 204, 220, 245 and 265, and route the control plane messages through the AAA servers to ensure confidential communications. Policies configured at the home agent, foreign agents, or the AAA servers 204, 220, 245 and 265 indicate how the Mobile Nodes will use these secure tunnels for message transfer. The home network for the Mobile Node can also be identified from the registration request.

Secure communication links between the AAA servers 204, 220, 245 and 265 will remain in place as long as the SLAs are valid. The AAA servers 220, 245 and 265 in the foreign networks 215, 235, and 255 and AAA server 204 in the home network 200 are configured with appropriate security policies that aid in the establishment of this SA. The present invention provides a security framework for control plane messages between different domains as the Mobile Node roams throughout the VPN.

Broker AAA Servers

Establishing multiple SLAs among multiple service providers and networks increases the management complexity of the system. In order to reduce this management complexity and allow large-scale roaming among different networks, Broker AAA Servers can be established to provide a common support platform for multiple SLAs. The Broker AAA Server essentially becomes a consortium of SLAs from various networks, and Mobile Nodes need only have a relationship with a single SLA maintained by an Broker AAA Server to acquire indirect access to other SLAs through the reciprocal agreements with other SLAs maintained by the Broker AAA Server (and indirectly other Broker AAA Servers). By allowing access to all SLAs in a network, the Mobile Node can roam throughout the networks without having to establish independent relationships with the other SLAs.

Figure 4:
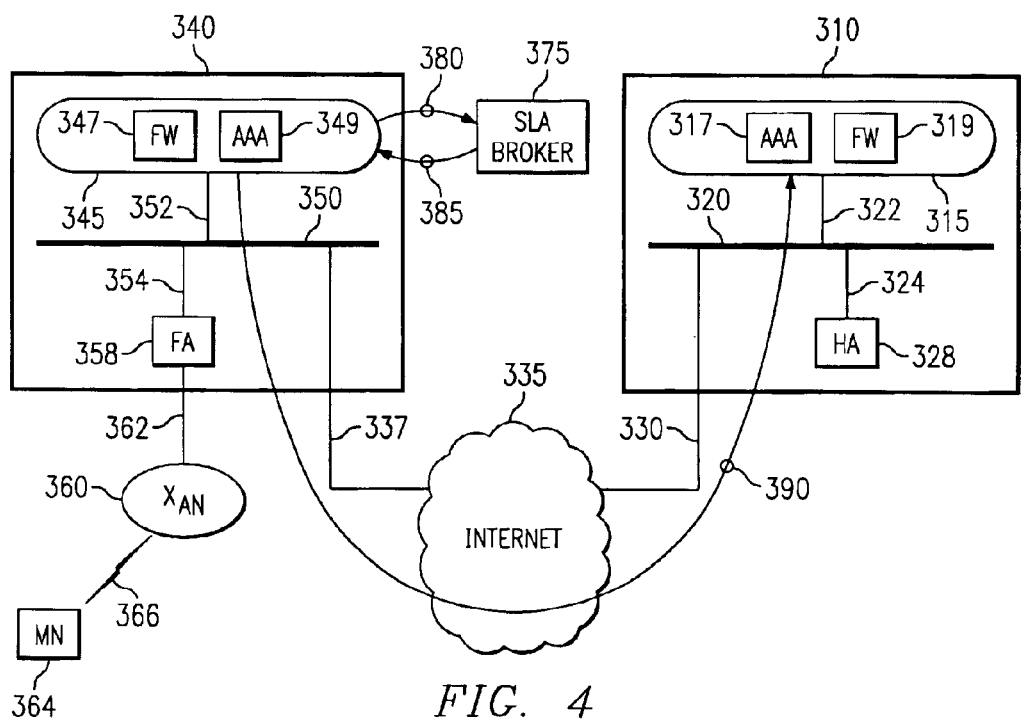
FIG. 4 is a schematic diagram showing the Broker AAA Server in the network configuration.

In FIG. 4, the home network 310 supports a secure messaging gateway 315 having an AAA server 317 and firewall 319. The secure messaging gateway 315 is coupled to the home network common buss line 320 via communication link 322. The home network 310 has a home agent 328 that is coupled to the home network communication buss 320 via communication link 324. The home network 310 is coupled to the public Internet 335 via communication link 330.

The foreign network 340 supports a secure messaging gateway 345 having an AAA server 349 and firewall 347. The secure messaging gateway 345 is coupled to the home network common buss line 350 via communication link 352. The foreign network 340 has a foreign agent 358 that is coupled to the foreign network communication buss 350 via communication link 354. The foreign network 340 is coupled to the public Internet 335 via communication link 337. The Mobile Node 364 communicates with the network via the cellular transceiver 360 (or any other type of Access Network coupled to the foreign network 340), which is coupled to the Foreign Agent 358 via communication link 362.

After moving to the foreign network 340 or upon power-up at that network and under the condition that no SLA exists between the foreign network 340 and the home network 310, the Mobile Node 364 will first send a registration request message to the Foreign Agent 358. The registration request and response may be sent initially in the clear to establish the relationship, but the registration request and response must be re-established later in a secure connection. In order to establish this secure connection, the Foreign Agent 358 forwards the registration request to the foreign AAA server 349, and the AAA server 349 looks at the address of the mobile node 364 from the registration request to confirm whether an SLA exists between the home network 310 and the foreign network 340. Thereafter, any registration requests and responses are established using the secure connection established initially according to the procedure described above.

After confirming that no SLA exists between the home network 310 and foreign network 340, the AAA server 349 consults with the Broker AAA Server 375 in communication 380. The communication 380 includes a Domain Discovery Request (DDR) message which requests the Broker AAA Server for the identification of the target domain system. If the Broker AAA Server 375 is associated with the home network 310, the Broker AAA Server 375 sends a response 385 to the AAA server 349. The response 385 includes a Domain Discovery Answer (DDA) message that has a security mechanism generated to establish the SLA between the foreign and home networks.

The response 385, a DDA message, includes the Result-Code AVP set to DIAMETER_REDIRECT_

INDICATION. When a response 385 is received with the Result-Code set to this value, the message must also include one or more Redirect-Host AVPs, and optionally the Redirect-Host-Port AVP. The Redirect-Host AVP contains the IP address to which the request should be forwarded to directly. Multiple instances of the AVP indicate a list of different hosts that can be contacted.

The above protocol messaging requires that the AAA Broker Server 375 be contacted for all messages to unknown realms, in order to identify the Home Diameter server to use for a particular realm. Since contacting the AAA Broker Server 375 introduces an additional latency, an implementation may cache the information received by the AAA Broker Server 375, eliminating the overhead of contacting the AAA Broker Server 375 multiple times for the same domain. The AAA Broker Server 375 may include the Session-Timeout AVP in the redirect response as a hint to its peer as to how long the cache entry should be valid. The peer is not obligated to respect the hint from the AAA Broker Server 375.

In the event that the Redirect-Host AVP is tagged, the AAA Broker Server 375 may also add the tag to the Session-Timeout AVP in order to specify the cache timeout for the particular host. When returning the response with the Result-Code set to DIAMETER_REDIRECT_INDICATION, the AAA Broker Server 375 may also include the certificates of both the requesting server, and the target server. These certificates are encapsulated in a CMS-Data AVP. The requesting server should forward the certificate that belongs to it in the subsequent request to the home Diameter server. In a more complex network, a request might be forwarded to a second or additional brokers (Inter-Broker Communication). This can be transparent to the AAAF server, as long as it receives a response to the request. Certificates may not be specifically required in the preferred implementation because any encryption key or public key encryption identification scheme can be used with the invention.

Broker Redirection

In FIG. 4, the message sequence for a broker redirection is shown. When the AAAF Server 349 receives the AMR message 410, it looks at the realm portion of the optional Destination-NAI or required User-Name AVP and compares it against its Destination Realm table. If there is no match, a broker referral table should be consulted. The broker table should contain the host name, IP address, and port number, and any needed security information to contact the broker system. The server may have a list of broker systems and could try them in a configured order until it gets a success. Failure to contact a system should lead to attempts to contact another broker as configured.

During message redirection authentication, if the AAAF Server 349 recognizes that it does not have the target domain of the NAI, then it will build a DDR request 380 to the AAA Broker Server 375. The AAA Broker Server 375 will respond with a DDA message 385 giving sufficient information to securely contact the AAAH Server 317. The AAAF Server 347 must be able to now forward the original AMR message to this previously unknown host.

Upon receipt of the AMR 410, the AAAF Server 349 processes the AMR 410 to determine if no local match exists for the target realm. It selects a known AAA Broker Server 375 and builds a DDR message 385 using the security information for that broker specified in its Broker table.

The AAA Broker Server 375 must then validate the received request against the information retained in the Server 375 on allowed request clients. The AAA Broker Server 375 then processes the Destination-NAI or User-Name attribute attempting to find a match on target realm. It may have any kind of database, and can proxy the request to another broker if necessary. If the target realm is not found, it will returns a DDA message 385 with a Result-Code of DIAMETER_DOMAIN_NOT_SERVED. If found, the AAA Broker Server 375 should return a Result-code of DIAMETER_REDIRECTION_INDICATION, and the Host information needed to contact the redirected host.

If a Result-Code of DIAMETER_DOMAIN_NOT_SERVED is received by the AAAF Server 349, another broker can be contacted and the sequence starts at the beginning. If the Redirection-Indication code of DDA message 385 is received, the host information will be processed.

After the AAAF Server 349 receives the appropriate information, the AAAF Server 349 will initiate the security association pursuant to the returned information in the DDA message 385. The appropriate message 390 is sent from the AAAF Server 349 to the designated host AAA Server 317. The host AAAH Server 317 processes the request and returns the appropriate answer to the AAAF Server 349.

The key AVPs are of the same format as Mobility Agent Session Key AVPs, except that the message format includes a complex data element consisting of a 32-bit SPI and a data octet string. Details for each of the important messages in the redirection exchange supply the minimal information for referral. Other AVPs from the request message are not disclosed to the brokers for this operation as shown in FIG. 5. For a Broker Redirection, the Result-Code must be present and set accordingly. The broker will return information on how to contact the target AAA host. However, it will not echo back the information from the original request. If the request was in error, a Failed-AVP-Code AVP would be returned as shown in FIG. 6. The request sent to the Redirected Host should be copied from the original request, not the Broker's response as shown in FIG. 7.

The following is a description of only the AVPs unique and relevant to this type of operation.

Result-Code AVP (268)

For Broker Redirection, this AVP must be included and must be set to the value of DIAMETER_REDIRECT_INDICATION (9). This is what tells the AAAF server that the information is a redirection request and not a proxy through.

Destination-NAI AVP (269)

The Destination-NAI AVP is of type String, must be included in the Request when using NAI routing, and should be included in a response message. When found in a response, the AVP should contain the value of the Host-Name AVP that was found in the request.

Redirect-Host AVP (278)

The Redirect-Host AVP is of type Address and is returned in a response that has the Result-Code AVP set to DIAMETER_REDIRECT_REQUEST. This AVP includes the IP address of the Diameter host to which the request must be redirected. The presence of multiple tagged Redirect-Host AVPs implies that all of the addresses may be used to contact the host AAA server in question. When multiple untagged Redirect-Host AVPs are found, they represent separate hosts. Upon receipt of such a Result-Code, and this AVP, a Diameter host should send the request directly to one of the hosts.

The broker may wish to return the certificate associated with a given Redirect-Host AVP. In the proposed Diameter drafts can be returned in a CMS-Data AVP. In this implementation, the security information will be returned in vendor specific AVP.

Redirect-Host-Port AVP (277)

The Redirect-Host-Port AVP is of type Integer32 and may be present when the Redirect-Host AVP is present. The absence of this AVP implies that the reserved port must be used.

Session-Timeout (27)

The Session-Timeout AVP is of type Integer32 and may be present on a Redirect-Host response message. It is used to indicate the amount of time that the host information can be cached in the AAAF server. The o server may or not have a cache, and can ignore this information. The session key assignments will expire after this time.

CMS-Data (310)

This is the current Diameter Strong Crypto AVP [SSecEx] used to return digital certificates or other encrypted data using CMS objects (RFC 2630) and SMIME formatting (RFC 2633). This is an optional value not used in current implementation.

These are other possible IPM assigned AVP values and type codes. They are not currently using Vendor type encoding.

Command-Code (256)

The following two command codes are used for the Proxy Broker request messages, including DDR—Domain-Discovery-Request (345) and DDA—Domain-Discovery-Answer (346)

AAF-to-AAB-Password (382)

This is a shared secret identifier encoded by the encryption key used between the AAAF client and the Broker server (AAAB). It authenticates the client to broker.

AAF-to-AAH-Kev (383)

This is a session key generated by the broker server encrypted with the AAAF-AAAB session key. The AAAF server must decrypt it and use it as the session key with the AAAH server.

AAH-to-AAF-Kev (384)

This is a session key generated by the broker server encrypted with the AAAB-AAAH shared key. The AAAH server must decrypt it and use it as the session key with the AAAF server.

AAH-to-AAB-Password (385)

This is a shared secret identifier encoded by the encryption key used between the AAAH client and the Broker server (AAAB). This authenticates the AAAF as having a valid referral from the broker.

Broker-Identifier (386)

This is a string identifying the broker that made the referral for this session. Broker-identifier is to be used for accounting and status reporting.

Broker-Client Info (387)

This is a string identifying the Service Agreement that this referral was made under by the broker. This could contain detailed Service Level Agreement between AAAF and AAAH being setup by Broker.

Broker-Referral-Info (388)

This is information about the specific session referral and can. contain token or binary identifying information between the broker's system and its clients.

Message Security

Information in Diameter can be secured using three different methods: 1) secure transport (such as Ipsec), 2) encrypted attributes (Encrypted Payload AVP), and 3) PKI certificates (CMS Data AVP). The AAAF to Broker connection could be kept secured with IPsec, but the connection between the AAAF and AAAH would only be made on demand. Information on the broker security association is stored in a broker table on the AAAF Server 347 and the AAA Broker Server 375.

The AAAF Broker's table should contain a shared key and a shared identifier. The identifier is encrypted with the shared key to authenticate the connection. The message exchange between the AAAF Server 347 and the AAA Broker Server 375 is secured by configured security information per Diameter security rules. The AAA Broker Server 375 is configured with information about the clients with which it accepts requests from.

This client information would be entered after service agreements are in place. The AAA Broker Server 375 is responsible for knowing which realms have authorized service from which providing networks and the type of service allowed. The response message is secured using the request connection security or a shared secret with this client.

The host servers that the AAA Broker Server 375 can service (redirect us to), it must have security information stored in the AAA Broker Server. Additionally, the AAA Broker Server could proxy the request within its system or infrastructure, and it may refer the request to a AAA Broker Server 375 under different administration. In these cases, the same path must return the response as the request came.

It is also possible that the AAA Broker Server 375 could make queries into targeted network's AAA servers. The broker must provide the requestor with three keys: 1) referral session key encrypted by the key shared between the AAAF and AAAB, 2) referral session key encrypted by the key shared between the AAAB and AAAH, and 3) shared identifier with the AAAH encrypted with a shared key known between the AAAB and the AAAH. Because the key AVPs are encrypted, they can be passed on a non-secure transport.

The encryption can be made using a shared secret or public keys, in the same manner as the Key AVPs returned by the AAAH in the Diameter Mobile IP Extentions when setting up the data security. If using PKI, the broker must be able to interface with a Certificate Authority (CA) or have those keys in storage.

While the invention has been particularly shown and described with respect to preferred embodiments, it will be readily understood that minor changes in the details of the invention may be made without departing from the spirit of the invention.

Having described the invention, we claim:

1. The method of establishing a connection for a mobile node on a communication system having a home network for the mobile node and at least one foreign network comprising the steps of:

receiving a registration request message at a foreign network Authentication, Authorization, Accounting server;

transmitting a request to an Authentication, Authorization, Accounting broker server to obtain service level agreement information to establish a secure connection between the foreign and home networks;

receiving at the foreign network Authentication, Authorization, Accounting server a response transmitted from the Authentication, Authorization, Accounting broker server containing service level agreement information stored on the Authentication, Authorization, Accounting broker server, wherein the response transmitted from the Authentication, Authorization, Accounting broker server contains the Internet Protocol address of the home network to which the request should be directly forwarded and one or more instances of a first value to indicate that one or more different host networks can be contacted.

2. The method of establishing a home network connection in claim 1 further comprising the step of:
establishing a connection with an Authentication, Authorization, Accounting server on the home network based upon the information received from the Authentication, Authorization, Accounting broker server.

3. The method of establishing a home network connection in claim 1 further comprising the step of:
receiving a response from the Authentication, Authorization, Accounting broker server with a rejection response after the Authentication, Authorization, Accounting broker server determines that the home network is not found by the Authentication, Authorization, Accounting broker server.

4. The method of establishing a home network connection in claim 1 further comprising the step of:
transmitting the request to the Authentication, Authorization, Accounting broker server for all messages to be addressed to unknown networks in order to identify the home network.

5. The method of establishing a home network connection in claim 1 further comprising the step of:
receiving the response from the Authentication, Authorization, Accounting broker server with a tag value that indicates the timeout value for a particular host.

6. The method of establishing a home network connection in claim 1 further comprising the step of:
receiving the response from the Authentication, Authorization, Accounting broker server with a session time-out value as a discretionary indication to the home network server on how long the home network entry should be maintained as valid on the foreign network.

7. The method of establishing a home network connection in claim 1 further comprising the step of:
receiving the response from the Authentication, Authorization, Accounting broker server with a tag value that indicates a host sever selection value.

8. The method of establishing a home network connection in claim 1 further comprising the step of:
receiving the response from the Authentication, Authorization, Accounting broker server with a certificate of the foreign network server and the host network server.

9. The method of establishing a home network connection in claim 8 further comprising the step of:
receiving the response from the Authentication, Authorization, Accounting broker server with a certificate encapsulated in an Attribute Value Pair of the foreign network server and the host network server.

10. The method of establishing a home network connection in claim 8 further comprising the step of:
receiving the response from the Authentication, Authorization, Accounting broker server with a certificate of the foreign network server and the host network server where the foreign network server forwards the certificate in a communication to the home AAA Authentication, Authorization, Accounting server.

11. The method of establishing a home network connection in claim 1 further comprising the step of:
receiving the response from the Authentication, Authorization, Accounting broker server with a certificate encapsulated in an Attribute Value Pair of the foreign network server and the host network server.

12. The method of establishing a home network connection in claim 1 further comprising the step of:
transmitting a request to a second Authentication, Authorization, Accounting broker server in response to the response received by the foreign network server.

13. The method of establishing a home network connection in claim 1 further comprising the step of:
receiving the response from the Authentication, Authorization, Accounting broker server after the Authentication, Authorization, Accounting broker server validates the request from the foreign network against information retained in the Authentication, Authorization, Accounting broker server on allowed request clients.

14. The method of establishing a home network connection in claim 1 further comprising the step of:
receiving the response from the Authentication, Authorization, Accounting broker server after the Authentication, Authorization, Accounting broker server validates the request from the foreign network by processing a destination attribute in an attempt to find a match on the home network.

15. The method of establishing a home network connection in claim 1 further comprising the step of:
receiving the response from the Authentication, Authorization, Accounting broker server after the Authentication, Authorization, Accounting broker server validates the request from the foreign network by processing a user name attribute in an attempt to find a match on the home network.

16. The method of establishing a home network connection in claim 15 further comprising the step of:
receiving the response from the Authentication, Authorization, Accounting broker server after the Authentication, Authorization, Accounting broker server validates the request from the foreign network by processing a destination attribute in an attempt to find a match on the home network.

17. The method of establishing a connection for a mobile node on a communication system having a home network for the mobile node and at least one foreign network comprising the steps of:
receiving a registration request message at a foreign network Authentication, Authorization, Accounting server;
transmitting a request to an Authentication, Authorization, Accounting broker server to obtain service level agreement information to establish a secure connection between the foreign and home networks;
receiving at the foreign network Authentication, Authorization, Accounting server a response transmitted from the Authentication, Authorization, Accounting broker server containing service level agreement information stored on the Authentication, Authorization, Accounting broker server, wherein the response transmitted from the Authentication, Authorization, Accounting broker server contains the Internet Protocol address of the home network to which the request should be directly forwarded, and one or more instances of a first value to indicate that one or more different host networks can be contacted; and
contacting a second Authentication, Authorization, Accounting broker server after a rejection response is received from the Authentication, Authorization, Accounting broker server.

18. The method of establishing a home network connection in claim 1 further comprising the step of:

after receiving the response from Authentication, Authorization, Accounting broker server that services the home network, the foreign network initiates a security association pursuant to the returned service level agreement information in the response message by transmitting a message to the home network from the foreign network.

19. The method of establishing a home network connection in claim 1 further comprising the step of:

receiving message from the home network server at the foreign network Authentication, Authorization, Accounting server after the home network that services the home network Authentication, Authorization, Accounting server processes a request from the foreign network server for a secure connection.

20. A system for establishing a home network connection of a mobile node on a foreign network in a wireless communications network comprising:

a home network having a home agent coupled to a home Authentication, Authorization, Accounting server;

a foreign network having a foreign agent coupled to a foreign Authentication, Authorization, Accounting server;

a mobile node transmitting a request to the foreign Authentication, Authorization, Accounting server in a request to establish a secure connection between the mobile node and the home network;

an Authentication, Authorization, Accounting broker server coupled to the foreign Authentication, Authorization, Accounting server transmitting a request to the Authentication, Authorization, Accounting broker server to determine the location of the home network and security association information for establishing the secure connection between the mobile node and the home network according to a security protocol specified in the Authentication, Authorization, Accounting broker server; and the foreign Authentication, Authorization, Accounting server receives a response from the Authentication, Authorization, Accounting broker server with the Internet Protocol address of the home network to which the request should be directly forwarded and one or more instances of a first value to indicate that one or more different host networks can be contacted.

21. The system set forth in claim 20 wherein:

the foreign Authentication, Authorization, Accounting server receives a response from the Authentication, Authorization, Accounting server broker server that contain the Internet Protocol address of the home network to which the request should be directly forwarded.

22. The system set forth in claim 20 wherein:

the foreign Authentication, Authorization, Accounting server transmits the request to the Authentication, Authorization, Accounting broker server for all messages to be addressed to unknown networks in order to identify the home network.

23. The system set forth in claim 20 wherein:

the foreign Authentication, Authorization, Accounting server receives a response from the Authentication, Authorization, Accounting broker server with a tag value that indicates a host server selection value.

24. The system set forth in claim 20 wherein:

the foreign Authentication, Authorization, Accounting server receives a response from the Authentication, Authorization, Accounting broker server that includes a session time-out value as a discretionary indication to the foreign network server on how long the home network entry should be maintained as valid on the foreign network.

25. The system set forth in claim 24 wherein:

the foreign Authentication, Authorization, Accounting server receives the response from the Authentication, Authorization, Accounting broker server with a tag value that indicates a host server selection value.

26. The system set forth in claim 20 wherein:

the foreign Authentication, Authorization, Accounting server receives the response from the Authentication, Authorization, Accounting broker server with a certificate of the foreign network server and the host network server.

27. The system set forth in claim 20 wherein:

the foreign Authentication, Authorization, Accounting server receives the response from the Authentication, Authorization, Accounting broker server with a certificate encapsulated in an Attribute Value Pair of the foreign network server and the host network server.

28. The system set forth in claim 20 wherein:

the foreign Authentication, Authorization, Accounting server receives the response from the Authentication, Authorization, Accounting broker server with a certificate that is forwarded to the home Authentication, Authorization, Accounting server.

29. The system set forth in claim 28 wherein:

the foreign Authentication, Authorization, Accounting server receives the response from the Authentication, Authorization, Accounting broker server with a certificate encapsulated in an Attribute Value Pair of the foreign network server and the host network server.

30. The system set forth in claim 20 wherein:

the foreign Authentication, Authorization, Accounting server transmits a second request to a second Authentication, Authorization, Accounting broker server in response to a rejection response received from the Authentication, Authorization, Accounting broker by the foreign network server.

31. The system set forth in claim 20 wherein:

the foreign Authentication, Authorization, Accounting server receives a response from the Authentication, Authorization, Accounting broker server after the Authentication, Authorization, Accounting broker validates the request from the foreign network against the information retained in the Authentication, Authorization, Accounting broker server on the allowed request clients.

32. The system set forth in claim 20 wherein:

the foreign Authentication, Authorization, Accounting server receives a response from the Authentication, Authorization, Accounting broker server after the Authentication, Authorization, Accounting broker validates the request from the foreign network by processing a destination attribute in an attempt to find a match on the home network.

33. The system set forth in claim 20 wherein:

the foreign Authentication, Authorization, Accounting server receives a response from the Authentication, Authorization, Accounting broker server after the Authentication, Authorization, Accounting broker validates the request from the foreign network by processing a user name attribute in an attempt to find a match on the home network.

34. The system set forth in claim 33 wherein:

the foreign Authentication, Authorization, Accounting server receives a response from the Authentication, Authorization, Accounting broker server after the Authentication, Authorization, Accounting broker validates the request from the foreign network by processing a destination attribute in an attempt to find a match on the home network.

35. The system set forth in claim 20 wherein:

the foreign Authentication, Authorization, Accounting server receives a rejection response from the Authentication, Authorization, Accounting broker server after the Authentication, Authorization, Accounting broker server determines that the home network is not found serviced by the Authentication, Authorization, Accounting broker server.

36. The system set forth in claim 20 wherein:

the foreign Authentication, Authorization, Accounting server contacts a second Authentication, Authorization, Accounting broker server after a rejection response is received from the Authentication, Authorization, Accounting broker server.

37. The system set forth in claim 20 wherein:

the foreign Authentication, Authorization, Accounting server initiates a security association pursuant to the returned information in the response message by transmitting a message to the home network from the foreign network.

38. The system set forth in claim 20 wherein:

the foreign Authentication, Authorization, Accounting server receives a message from the home network server to the foreign network server after home network server processes the request from the foreign network server for a secure connection.

39. A method for establishing a connection for a mobile node on a communication system having a home network for the mobile node and at least one foreign network comparing the steps of:

receiving a registration request message at a foreign Authentication, Authorization, Accounting server;

transmitting a request to an Authentication, Authorization, Accounting broker server to obtain service level agreement information to establish a secure connection between the foreign and home network;

receiving at the foreign network Authentication, Authorization, Accounting server a response from the Authentication, Authorization, Accounting broker server containing service level agreement information wherein the response transmitted from Authentication, Authorization, Accounting broker server contains the Internet Protocol address of the home network to which the request should be directly forwarded and one or more instances of a first value to indicate that one or more different host networks can be contacted; and establishing a secure connection with an Authentication, Authorization, Accounting server on the home network based upon the service level agreement information received from the Authentication, Authorization, Accounting broker server to encrypt information packets transmitted between the home network and the mobile node.

* * * * *